June 20, 1933.  G. A. FISHER  1,914,773

SEALING AND IDENTIFYING DEVICE FOR DISPLAY HOLDERS

Filed Aug. 6, 1932  2 Sheets-Sheet 1

Inventor

George A. Fisher

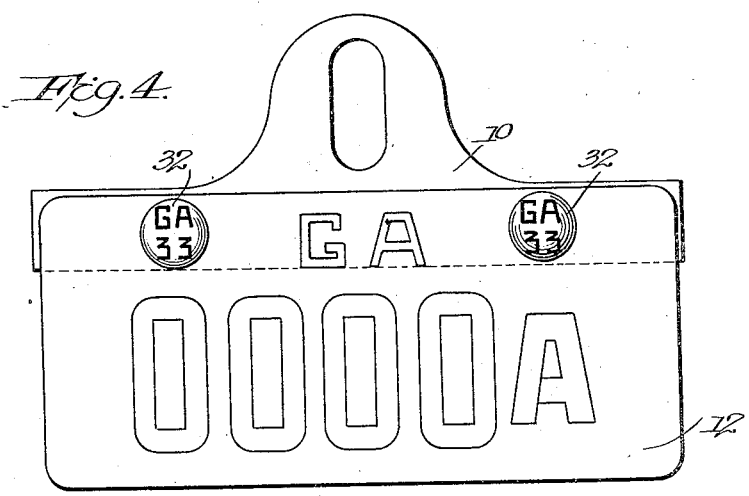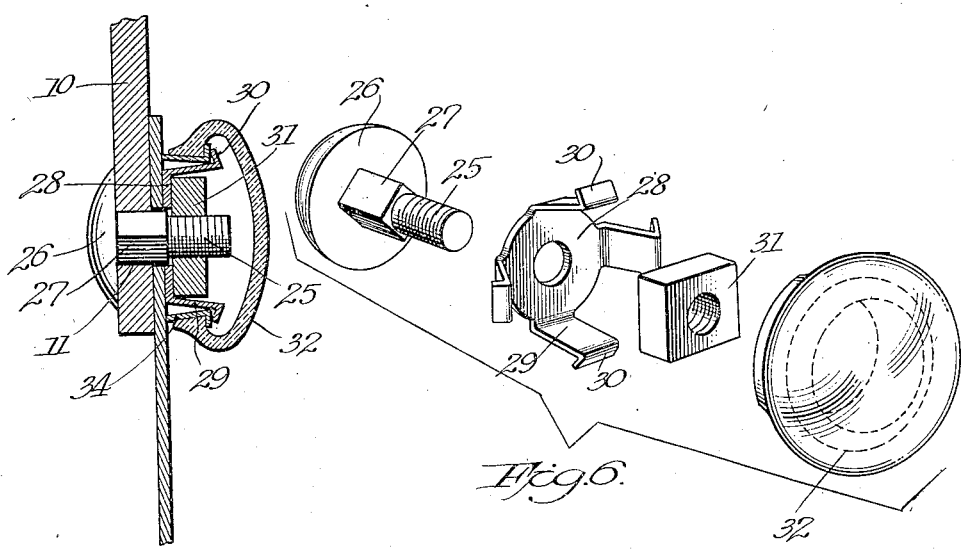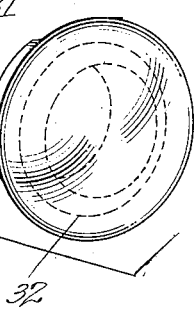

Patented June 20, 1933

1,914,773

UNITED STATES PATENT OFFICE

GEORGE A. FISHER, OF MILLEDGEVILLE, GEORGIA, ASSIGNOR TO NU-WA SERVICE COMPANY, OF BALDWIN COUNTY, GEORGIA, A CORPORATION

SEALING AND IDENTIFYING DEVICE FOR DISPLAY HOLDERS

Application filed August 6, 1932. Serial No. 627,779.

The invention relates to a sealing and an identifying device for display holders.

The invention is here disclosed as applied more particularly to a holder or bracket to which motor vehicle license plates are affixed and it is strictly understood that such disclosure is merely for illustrative purposes only.

Difficulty has been experienced, by the authorities in states and other jurisdictions throughout the country where motor vehicle licenses are issued, in the illegal transference or substitution of license plates from one motor vehicle to another, as well as the use of "dead" license plates.

Various methods have been devised to eradicate this practice, but so far the procedures heretofore adopted have been quite complicated and where mechanical devices have been used, their success has been extremely doubtful.

It is one of the objects of the present invention to retard and discourage the removal of motor vehicle license plates when once affixed to the holder or bracket of the motor vehicle.

It is a further purpose of my invention to provide a display element or license plate which may be permanently assigned to the user, such display element to bear the usual or any desired insignia and to combine with such permanently assigned display element or license plate a renewable indicia bearing element, which must be broken to be removed, so that any desired or stated intervals such indicia bearing element can be broken and renewed, without the necessity of periodically renewing the display element or license plate.

Another object of the invention is to provide a device of the character described which is simple in construction, easy of operation and cheap to manufacture.

Various other objects and advantages will appear in the description of the invention and as disclosed in the drawings.

With reference to the drawings:

Figure 1 discloses a plan view of the invention when installed.

Figure 2 discloses a sectional side view of the invention.

Figure 3 discloses a perspective view of the various elements forming the invention.

Figure 4 discloses a view of the license plate holder or bracket showing the identifying indicia both on the license plate and upon the device forming the present invention.

Figure 5 discloses a side sectional view of a second form of the invention.

Figure 6 discloses a perspective view of the various elements forming the invention disclosed in Figure 5.

Referring more particularly to the drawings in which like numbers indicate like parts, the numeral 10 indicates the holder or bracket of the usual type used on motor vehicles to support the license plates and is provided with apertures 11. The license plate is indicated by the numeral 12 and when properly positioned its upper edge portion is usually contiguous with the lower edge portion of the holder.

The sealing and identifying device forming the subject matter of the present invention, as shown in Figures 2 and 3, comprises a bolt 13 having an aperture 14 in the shank thereof, a washer 15 provided with spring arms 16 having flanges or shoulders 17, a nut 18, a cotter pin 19 and a sealing member 20.

The sealing member 20 may be made of a variety of frangible materials in order that it may be shattered upon proper impact.

In configuration the sealing member 20 is substantially round, substantially hollow, and has a closed face 21. The base 22 is open and a shoulder 23 is provided within the sealing member. The distance between the outer end of the base and the shoulder 23 is substantially equal in length to the spring arms 16. If desired, a bushing 24 may be disposed within the bore of the member 20. The shoulders 17 of the spring arms are adapted to cooperate with and hook over the shoulder 23 and irremovably position said sealing member.

On the face of the sealing member it is proposed to inscribe identification indicia such as for instance the symbols of the state from which and the year in which issuance of the motor vehicle license is made. Such procedure will necessitate only the issuance annually to motor vehicle owners of the sealing member eliminating thereby the issuance of the entire license place which will have inscribed thereon only the identifying numbers and if desired the symbols of the state of issuance, as shown in Figure 4.

Assembly of the device for operation is well shown in Figures 2 and 3. The bolt is inserted into the apertures 11 of the holder or bracket and through the usual apertures of the license plate. The washer 15 is then placed in position and the nut 18 screwed on the shank of the bolt to securely hold the license plate. The aperture 14 in the shank of the bolt receives the cotter pin 19, so that the nut is locked and cannot be unscrewed or loosened. The sealing member 20 is now snapped over the spring arms 16 of the washer and the flanges or shoulders 17 cooperate with the shoulder 23 of the sealing member, so that the latter is irremovably locked in place and cannot be removed except by the breakage thereof.

It will be noted that the outer edge of the base of the sealing member is contiguous with the license plate when in assembled position and the possibility of prying off the sealing member or gaining access to bend the spring arms out of locking engagement with the sealing member is greatly reduced, which might be the case were space provided between the outer edge of the base of the sealing member and the license plate for the insertion of a sharp-pointed tool.

In the form of the invention disclosed in Figures 5 and 6, there is provided a bolt 25 having a round head 26 and a portion of the shank is squared as at 27. A washer 28 is provided with spring arms 29 having flanges or shoulders 30. The said arms are slightly flared relative to the washer base and the said flanges or shoulders form slightly acute angles relative to the arms.

In this instance there being four upstanding spring arms, a nut 31 having four sides is provided and the sealing member 32 is substantially similar as heretofore described in relation to the sealing member 20 of the form of the invention shown in Figures 2 and 3, with the exception that in this instance the base 33 is slightly flared and bushed as at 34.

To assemble the various parts of the device the bolt is positioned as shown in Figure 5 and due to a part of the shank being squared it will not turn. The license plate is then properly positioned, the washer slipped onto the bolt shank and the nut affixed.

The slight flaring of the spring arms of the washer allows the nut to be tightly screwed against the said washer and be positioned in order that each side of said nut is adjacent one of the spring arms.

The sealing member is easily snapped over the spring arms due to the slightly flared base and the angular configuration of the flanges or shoulders at the ends of the said arms.

The sealing member when correctly positioned will be securely held in place and the spring arms will be pressed in substantially against the sides of the nut, thereby locking the nut from turning and becoming loosened.

It is possible, of course, and contemplated where desired and necessary, that more than four spring arms may be provided in which case the nut will be shaped with sides corresponding in number to the said arms.

In order that the device be removed, it is necessary to shatter the frangible sealing member by proper impact which will expose the various parts of the device.

Obviously when the frangible sealing member has been destroyed an important part of the motor vehicle license has also been destroyed, so that the illegal substitution or transference of one license plate for another would be easily detected, since the necessary indicia appearing on the face of the sealing member would be lacking. Furthermore, the license plate may be permanently issued for use from year to year, and the renewal of the license may be readily accomplished at relatively small expense, by breaking off the sealing member, with its identifying indicia, and substituting therefor a sealing element bearing the indicia or other identifying characteristics of a succeeding year, without the necessity of renewing or removing the license plate.

There are various modifications and changes in the invention which are contemplated and allowed within the scope of the appended claims.

I claim:—

1. In combination with a motor vehicle license plate and holder bracket, a bolt provided with an aperture in its shank and a nut to attach the license plate to the holder bracket, a washer having spring arms provided with flanges positioned between the nut and the license plate, a cotter pin adapted to be inserted in said aperture, and a sealing member to cover said nut and cotter pin and provided with an opening and an interior shoulder, said spring arms and flanges adapted to be inserted into and contact throughout their length with the walls of the opening and said interior shoulder respectively, said sealing member when positioned being substantially contiguous to said license plate.

2. In combination with a motor vehicle license plate and a holder bracket, a bolt and nut to attach the license plate to the holder bracket, a washer having flared arms positioned between the nut and license plate, a sealing member to cover said nut, said flared arms being provided with means to irremovably lock said sealing member in position and adapted to lock said nut on said bolt.

3. In combination with a motor vehicle license plate and a holder bracket, a bolt and nut to attach the license plate to the holder bracket, a washer having flared arms positioned between the nut and license plate, a sealing member to cover said nut, said flared arms adapted to lock the nut on the bolt and being provided with flanges to irremovably lock said sealing member in position, said flanges being at substantially acute angles to said flared arms.

4. In combination with a motor vehicle license plate and a holder bracket, a bolt and nut to attach the license plate to the holder bracket, a washer having flared arms positioned between the nut and license plate, a sealing member to cover said nut and having an interior shoulder, said flared arms adapted to lock the nut on the bolt and being provided with flanges to engage the said interior shoulder to lock the sealing member in position, said flanges being at substantially acute angles to said flared arms.

5. In combination with a display element and a holder therefor, means to lock the display element to the holder, a substantially hollow frangible sealing member provided with an opening and an interior shoulder to cover said locking means, and a washer having spring arms adapted to extend into the sealing member and contact throughout their length with the walls of the opening, said arms having flanges to engage the interior shoulder of the sealing member, the distance between the inner edge of the sealing member and the interior shoulder being substantially equal to the length of the spring arms of the washer to insure close engagement.

6. In combination with a display element and a holder therefor, means to lock the display element to the holder, a substantially hollow frangible sealing member having a base portion provided with an opening and an interior shoulder, a bushing lining the walls of said opening and said shoulder, and means carried by said locking means adapted to engage said bushing to irremovably lock said sealing member in position.

7. In combination with a display element and a holder therefor, means to lock the display element to the holder, a substantially hollow frangible sealing member having a base portion provided with an opening and an interior shoulder, a bushing lining the walls of said opening, and a washer carried by said locking means and provided with spring arms engaging said bushing and shoulder respectively to irremovably lock said sealing member in position.

In testimony whereof I affix my signature.

GEORGE A. FISHER.